No. 827,168. PATENTED JULY 31, 1906.
J. J. MEYER.
DISH PAN.
APPLICATION FILED JAN. 25, 1906.

Witnesses
M. A. Schmidt
Geo. E. Few

Inventor
Joseph J. Meyer,
By Milo B. Stevens & Co.
Attorneys.

THE NORRIS PETERS CO., WASHINGTON, D. C.

UNITED STATES PATENT OFFICE.

JOSEPH J. MEYER, OF CHICAGO, ILLINOIS.

DISH-PAN.

No. 827,168.  Specification of Letters Patent.  Patented July 31, 1906.

Application filed January 25, 1906. Serial No. 297,763.

*To all whom it may concern:*

Be it known that I, JOSEPH J. MEYER, a citizen of the United States, residing at Chicago, in the county of Cook and State of Illinois, have invented new and useful Improvements in Dish-Pans, of which the following is a specification.

This invention is a pan or vessel having in the bottom thereof a hole with a removable plug and a removable strainer thereunder which will permit the contents of the pan to be strained when desired.

The invention is particularly applicable to dish-pans, whereby the dishes can be washed in the pan, after which the plug can be removed to allow the water to run off through the strainer, which will collect all the solid matter and may then be removed to allow such matter to be disposed of. This will prevent fouling of sinks. The invention will be found useful in draining vegetables and otherwise separating solid from liquid matters.

Figure 1:
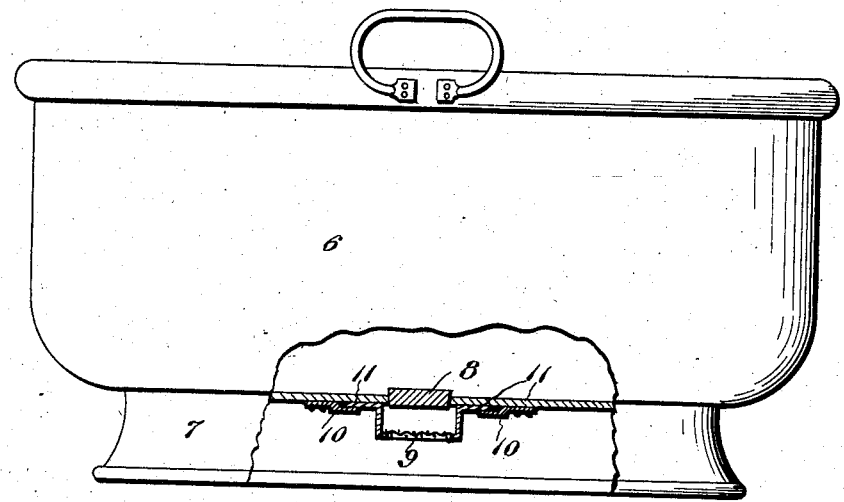
Figure 2:
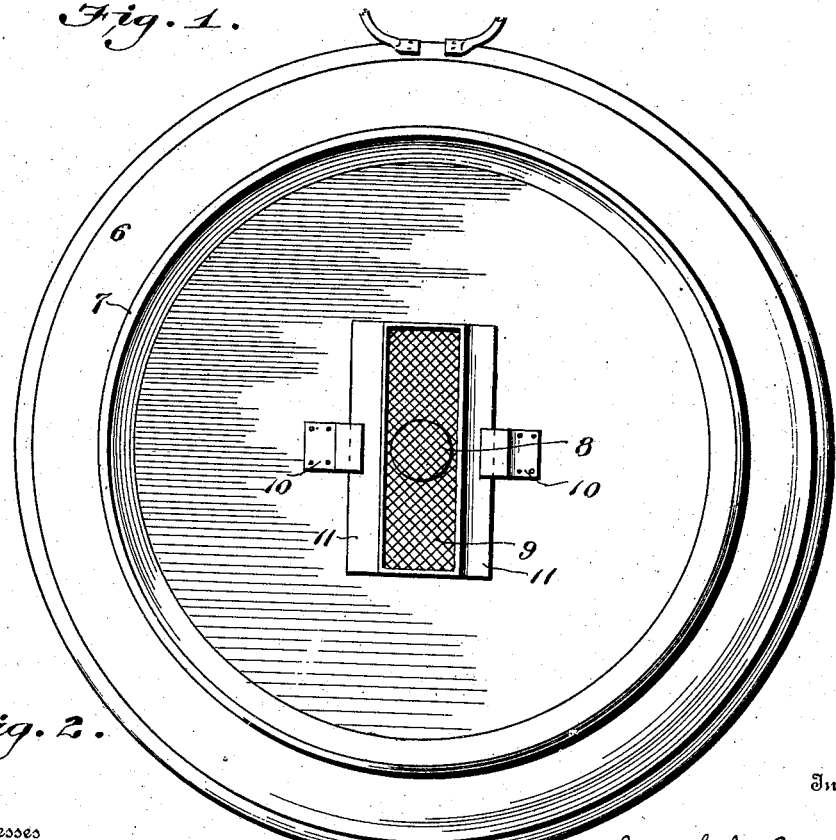

In the accompanying drawings, Figure 1 is a vertical cross-section showing the invention. Fig. 2 is an inverted plan view.

Referring specifically to the drawings, 6 indicates a pan or vessel of any desired form, size, and construction. It has a base-ring 7, on which it stands. In the bottom of the pan is a hole containing a removable plug 8, under which is a box-shaped strainer 9, which is supported by flanges 10 on the bottom of the pan and which may be slid in or out, as desired. The strainer has flanges 11, which rest upon the flanges 10, secured to the bottom of the vessel. In use the plug may be removed, allowing the liquid to run off through the strainer, in which the solid matter will be collected, and the strainer may then be slipped out and emptied.

I claim—

1. A pan having a hole in the bottom provided with a removable plug, flanged supports projecting downwardly from the bottom of the pan, beside said hole, and a strainer detachably engaged with said supports, under the hole.

2. A pan having a hole in the bottom provided with a removable plug, and a strainer-receptacle removably secured to the bottom of the pan, under the hole.

In testimony whereof I have signed my name to this specification in the presence of two subscribing witnesses.

JOSEPH J. MEYER.

Witnesses:
SIGNA FELTSKOG,
H. G. BATCHELOR.